Dec. 19, 1939.          J. L. CROY          2,184,211
CULTIVATOR ATTACHMENT
Filed Feb. 23, 1939
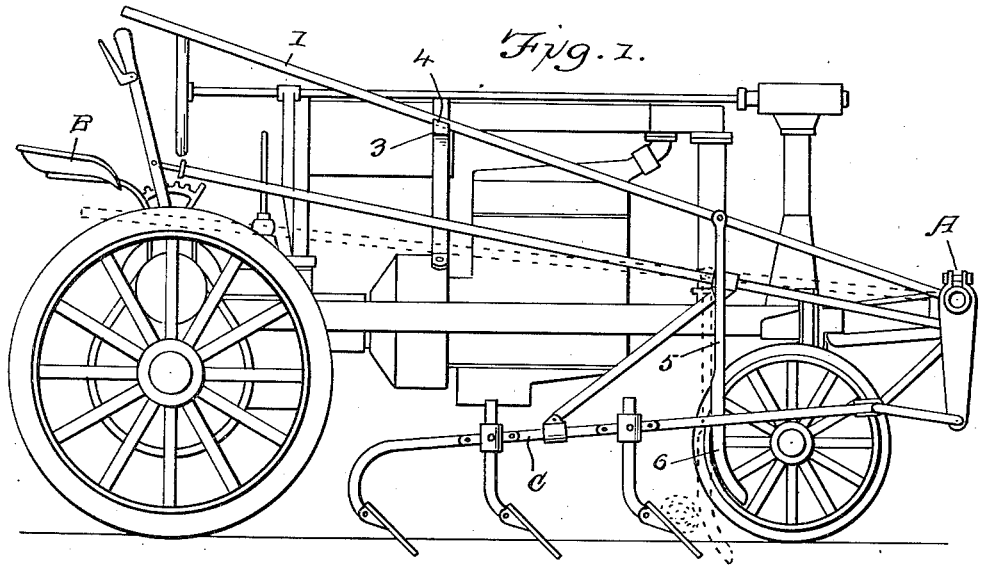
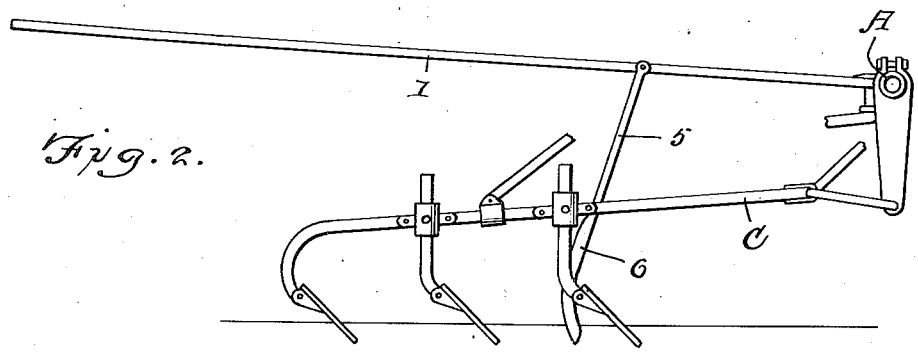
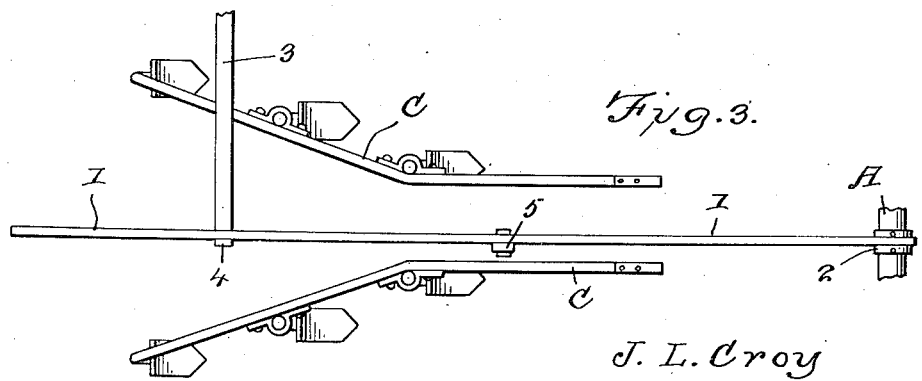
J. L. Croy
INVENTOR
BY Victor J. Evans & Co.
ATTORNEYS Patented Dec. 19, 1939

2,184,211

UNITED STATES PATENT OFFICE 2,184,211

CULTIVATOR ATTACHMENT

John L. Croy, Duncan, Okla.

Application February 23, 1939, Serial No. 258,038

5 Claims. (Cl. 97—179)

This invention relates to attachments for cultivators, and its general object is to provide an attachment that is primarily designed for cutting away debris that accumulates about and particularly across the shovels of gang or straddle row cultivators, so as to retain the shovels free from matter which damages the plants by brushing against the same or pulls them down so that they are plowed under, with the result it will be seen that my attachment eliminates the operator from stopping the cultivator from time to time for removing the debris by hand and straightening up the plants, thereby my attachment will materially save time as will be apparent.

A further object is to provide an attachment of the character set forth, that can be applied to cultivators of various types and is supported normally out of use, in convenient reach of the operator for disposal into and out of use in an easy and expeditious manner.

Another object is to provide a cultivator attachment that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation illustrating my attachment applied to a cultivator of the tractor propelled type, with the attachment shown supported out of use in full lines and arranged in use in dotted lines.

Figure 2 is a side elevation illustrating the position assumed by the knife of my attachment during its cutting function.

Figure 3 is a top plan view.

Referring to the drawing in detail, it will be noted that I have illustrated my attachment as being applied to a tractor propelled cultivator, but it will be obvious that it can be applied to and for use with any type of cultivator.

In the form of the attachment shown, it includes an operating bar 1 of a length to reach from the beam hanger supporting rod A, to a position in close proximity to the operator's seat B, and the forward end of the bar is pivotally secured to the rod A and held accordingly by a pair of spacing collars 2, as best shown in Figure 3.

Secured to any suitable means of the tractor in the form as shown, is a horizontally arranged supporting arm 3 for the bar 1 to receive and support the latter in the full line position of Figure 1, and the arm is provided with an upturned end 4 providing an abutment to prevent the bar from being casually removed from the arm. The upper face of the arm is preferably beveled or inclined forwardly as shown in dotted lines in Figure 1, to provide an ample bearing surface for the bar.

Pivotally secured to and depending from the forward portion of the bar 1 for disposal between the beams C of the shovels of the cultivator, is the shank 5 of a knife member including a blade 6 having its lower end curved forwardly and its rear edge is beveled to provide a cutting edge, as will be apparent.

It will be obvious that the rear end portion of the operating bar 1 provides a handle therefor, and in the use of the attachment, the bar is lifted from its supporting arm and lowered so that the blade 6 will penetrate the ground as shown in dotted lines in Figure 1. That action takes place while the cultivator is moving forwardly, and it will be obvious that such forward movement will cause the knife member to be swung on its pivot, with the ground acting as a fulcrum point, as indicated in Figure 2, so that the blade will be held in the path of debris, such as trash, sticks and the like disposed in bridging relation with respect to the shovels and thereby cut the same to allow it to free itself, thus preventing the debris from damaging the plants, as previously set forth.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A debris cutting attachment for a cultivator, comprising an operating bar, cutting means pivotally secured to said bar and depending therefrom for disposal in the ground in advance of the shovels of the cultivator to swing rearwardly on its pivot for cutting debris from the shovels, and said bar being connected to the cultivator for raising and lowering the cutting means into and out of use.

2. A debris cutting attachment for a cultivator, comprising an operating bar, cutting means pivotally secured to said bar and depending therefrom for disposal in the ground in advance of the shovels of the cultivator to swing rearwardly on its pivot for cutting debris from the shovels, said bar being connected to the cultivator for raising and lowering the cutting means into and out of use, and means for supporting the bar for holding the cutting means in an elevated position for disposal out of use.

3. A debris cutting attachment for a cultivator, comprising an operating bar, cutting means including a shank pivotally secured to said bar and depending therefrom, a blade formed on the lower end of said shank for disposal in the ground in advance of the shovels of the cultivator for swinging movement of the blade on its pivot for cutting debris from the shovels, said blade having a rearwardly directed cutting edge, said bar being connected to the cultivator for raising and lowering the cutting means into and out of use, and means for supporting the operating bar for holding the cutting means in an elevated position for disposal out of use.

4. A debris cutting attachment for a cultivator, comprising an operating bar, cutting means including a shank pivotally secured to said bar and depending therefrom, a blade formed on the lower end of said shank for disposal in the ground in advance of the shovels of the cultivator for the cutting means to swing rearwardly on its pivot for cutting debris from the shovels, said bar having its forward end pivotally secured to the cultivator and its rear end providing a handle for raising and lowering the cutting means into and out of use, an arm secured to the cultivator for supporting the operating bar for holding the cutting means in an elevated position for disposal out of use, and abutment means on said arm to prevent casual removal of the operating bar therefrom.

5. A debris cutting device for a straddle row cultivator, comprising an operating bar, cutting means including a shank pivotally secured to said bar and depending therefrom, a blade formed on the lower end of the shank for disposal in the ground in advance of the shovels of the cultivator for the cutting means to swing rearwardly on its pivot to dispose the blade between opposed shovels for cutting debris arranged in bridging relation with respect thereto, said blade having a forwardly curved lower portion provided with a rearwardly directed beveled cutting edge, said bar having its forward end pivotally connected to the cultivator and its rear end providing a handle for raising and lowering the cutting means into and out of use, an arm secured to the cultivator for supporting the operating bar for holding the cutting means in an elevated position for disposal out of use, and an upturned free end on said arm and providing an abutment to prevent casual removal of the operating bar from said arm.

JOHN L. CROY.